May 28, 1929.  G. F. WIKLE  1,714,832
TIRE BUILDING MACHINE
Filed June 15, 1925  2 Sheets-Sheet 2
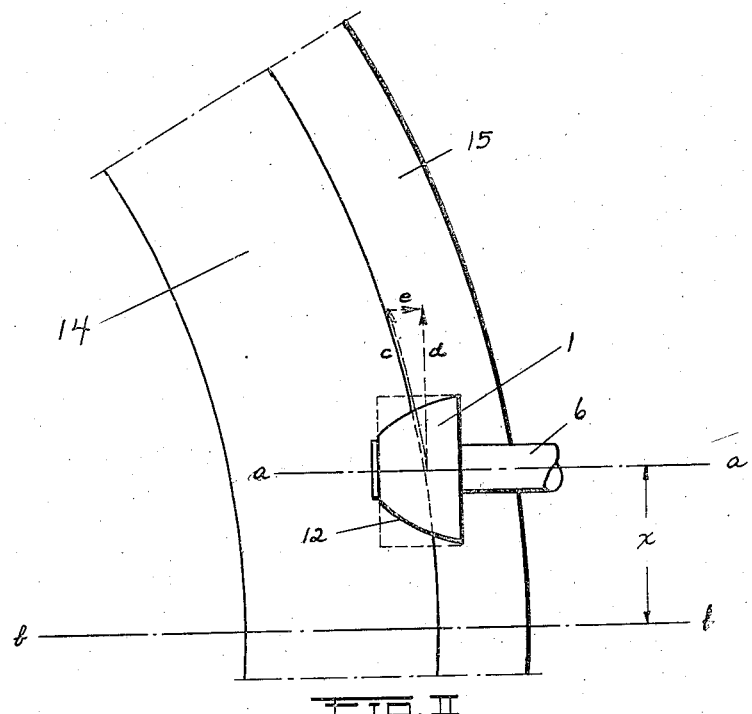
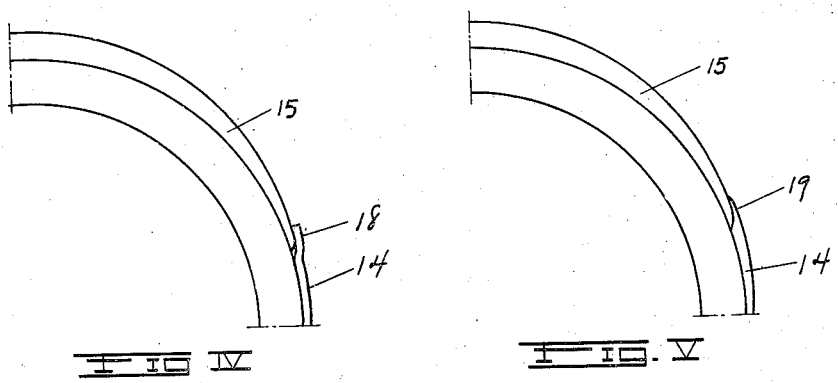
George F. Wikle
Inventor
By *Robert D. Harvey*
Attorney Patented May 28, 1929.

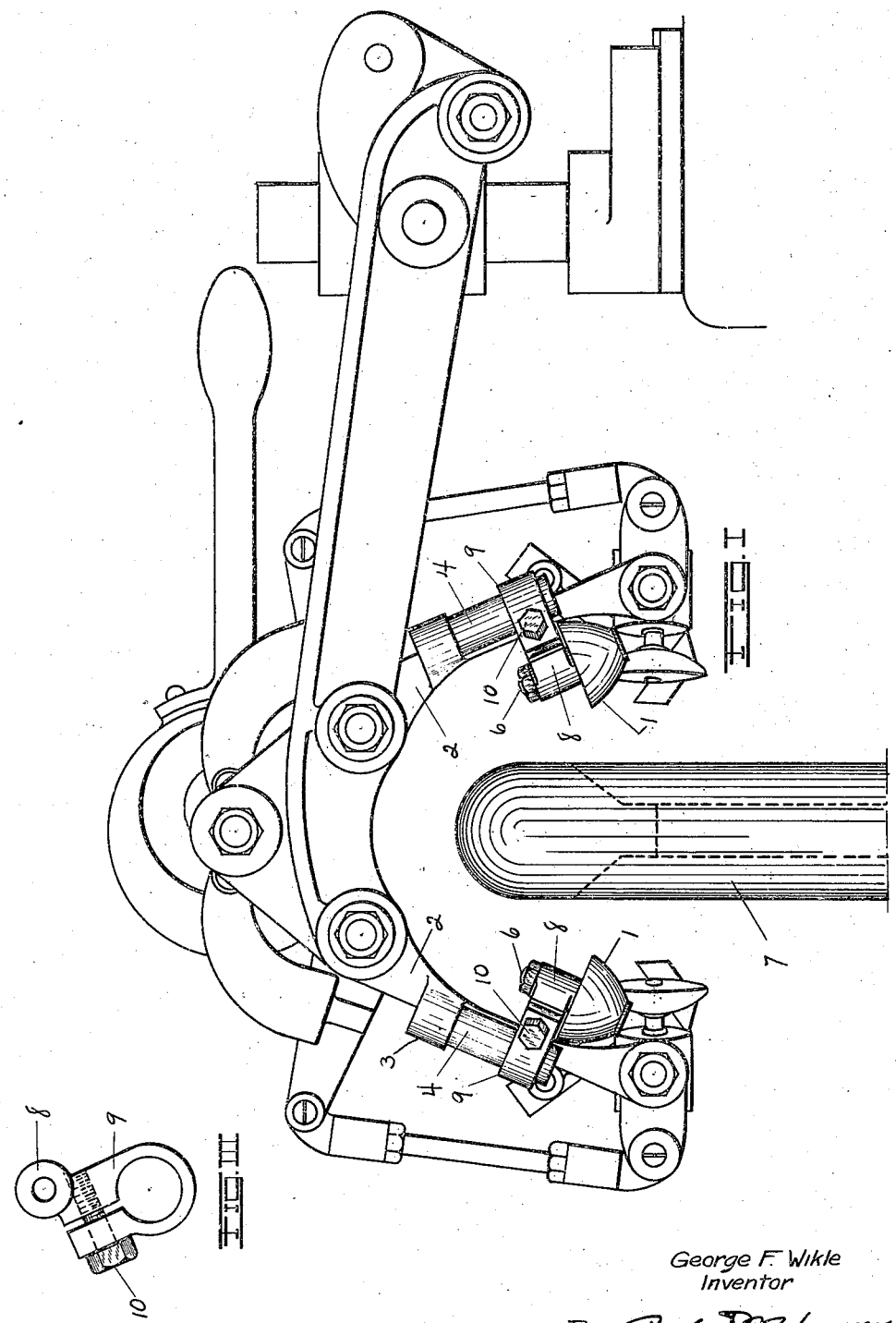

1,714,832

UNITED STATES PATENT OFFICE.

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TIRE-BUILDING MACHINE.

Application filed June 15, 1925. Serial No. 37,225.

This invention relates to machines for building pneumatic tire casings and more particularly to a device for uniting the edge of the side wall strip and the tread rubber.

In the manufacture of pneumatic tire casings it is customary to form the carcass upon a building core. The carcass is composed of the required number of plies of rubberized fabric, square woven or cord, to which are added the tread and the strip of side wall rubber. The latter strips overlap the edges of the tread strips and it is the object of this invention to provide means for uniting the sidewall and tread at this point in a manner to seal the overlap against the entrance of soapstone during subsequent operations and make the line of juncture of sidewall and tread uniform in appearance. This latter requirement is of especial importance where the tread and sidewall differ in color. Other and further objects will be apparent from the following specification and claims.

In the accompanying drawings which illustrate one embodiment of my invention

Figure 1 is a plan view showing the device attached to one of the building instrumentalities of a tire building machine, Figure 2 is a diagrammatical side view showing the device in relation to that portion of the casing upon which it operates, Figure 3 is a detail of the adjustable mounting, and Figures 4 and 5 are diagrammatic sections of a casing showing the overlap before and after the operation of the device.

Referring to the drawings, the device comprises rolls 1 mounted with their axis parallel to but above the plane passing through the axis and the horizontal diameter of the building core. The rolls may be supported in any suitable manner. In Figure 1 they are shown supported on arms 2 of the folding mechanism shown in my co-pending application Serial Number 705,377 filed April 9, 1924, Patent 1,647,163, Nov. 1, 1927, and movable therewith into operative relation to the core 7. As shown in Figure 1, lugs 3, having extending cylindrical projections 4, are formed on arms 2. The rolls 1 are rotatably mounted on shafts 6 secured in bosses 8 formed integral with a split collar 9 adapted to be adjustably positioned on projections 4 and held thereon in desired position by machine bolt 10. It will be understood that I do not limit myself to the specific mounting just described and that the rolls 2 may be supported in any other suitable manner.

As shown in the figures the rolls are formed with curved faces 12. The rolls are so formed for greater ease in adjusting the rolls to different curvatures of the tire section and different sizes of tires. If desired the rolls may have a cylindrical form as shown in dotted lines in Figure 2. As shown in the latter figure the axis $a—a$ of the rolls 1 are spaced a distance X above, but parallel to, the plane passing through the axis and the horizontal diameter $b—b$ of the core. The rolls 1 may obviously be positioned against the sidewall and tread overlap at any convenient point about the core circumference but the specified parallel offset relations to a plane passing through a diameter of the core is an essential feature of my invention. It will be obvious that, while in the position of rolls 1 illustrated the axes $a—a$ lie above plane $b—b$, if the rolls were to be placed in a diametrically opposite position with respect to the core annulus, the axes $a—a$ would lie below plane $b—b$. The essential feature is the relative positions shown, that is, that the axes $a—a$ shall be spaced from the plane $b—b$ in the direction of rotation of the core "$c$", in order that the component of movement "$e$", as later more fully described, may always be directed radially outwardly as indicated, regardless of the location of the rolls with respect to the core annulus.

As shown in Figure 4 the sidewall rubber strip 14 overlapping tread 15 at 18 presents a substantial projection. The rolls 1 are freely rotatable on their shafts 6 and when forcibly pressed against the rotating core with the casing thereon are rotated on their shafts. Besides the direct flattening pressure to overlap 18 the rolls, due to their offset position with respect to the axis of the core, have a further action illustrated by the force diagram shown by the arrows in Figure 2. The arrow "$c$" shows substantially the direction of rotation of the core in general and of the overlap 18, upon which the roll is operating, in particular. The motion imparted to the roll is of course about, and in a plane perpendicular to, its own axis and its direction may be illustrated by arrow "$d$". The resultant is a component of "motion" in the direction of the arrow "e". The relative position of the core and roll being fixed this motion takes place as a slip or drag on the surface of the casing, tending to drag the sidewall over the tread and producing the smooth uniform overlap of sidewall and tread shown diagrammatically in Figure 5, at 19. The amount of drag produced is obviously proportional to the distance X, being zero when the axis $a$—$a$ of the rolls 1 lie in the plane $b$—$b$ and reaching a maximum when the rolls 1 are positioned at the top of the core with their axis parallel to the plane passing through the diameter $b$—$b$ and the axis of the core but spaced therefrom a distance substantially equal to the core radius, in which position no rotation would be imparted to the rolls 1. The amount of drag desired, and therefore the spacing X, depends upon the thickness and character of the sidewall rubber strip.

Having described one embodiment of my invention, I claim:

1. In a tire building machine including a rotatable core, a device for uniting the edges of the tread and side wall rubber comprising a freely rotatable roll adapted to be brought into contact with a tire casing, supported on the core, at the point where the tread and side wall overlap, the axis of the roll being substantially parallel to a plane passing through the axis of rotation and a diameter of the core and spaced from said plane in the direction of the rotation of the core.

2. In a tire building machine including a rotatable core, a device for uniting the edges of the tread and side wall rubber comprising a freely rotatable convex roll adapted to be brought into contact with a tire casing, supported on the core, at the point where the tread and side wall overlap, the axis of the roll being substantially parallel to a plane passing through the axis of rotation and a diameter of the core and spaced from said plane in the direction of the rotation of the core.

In testimony whereof I have signed my name to the above specification.

GEORGE F. WIKLE.